May 10, 1955  L. E. KUBACKI  2,707,845
WRAPPING DEVICE
Filed May 4, 1953  2 Sheets-Sheet 1
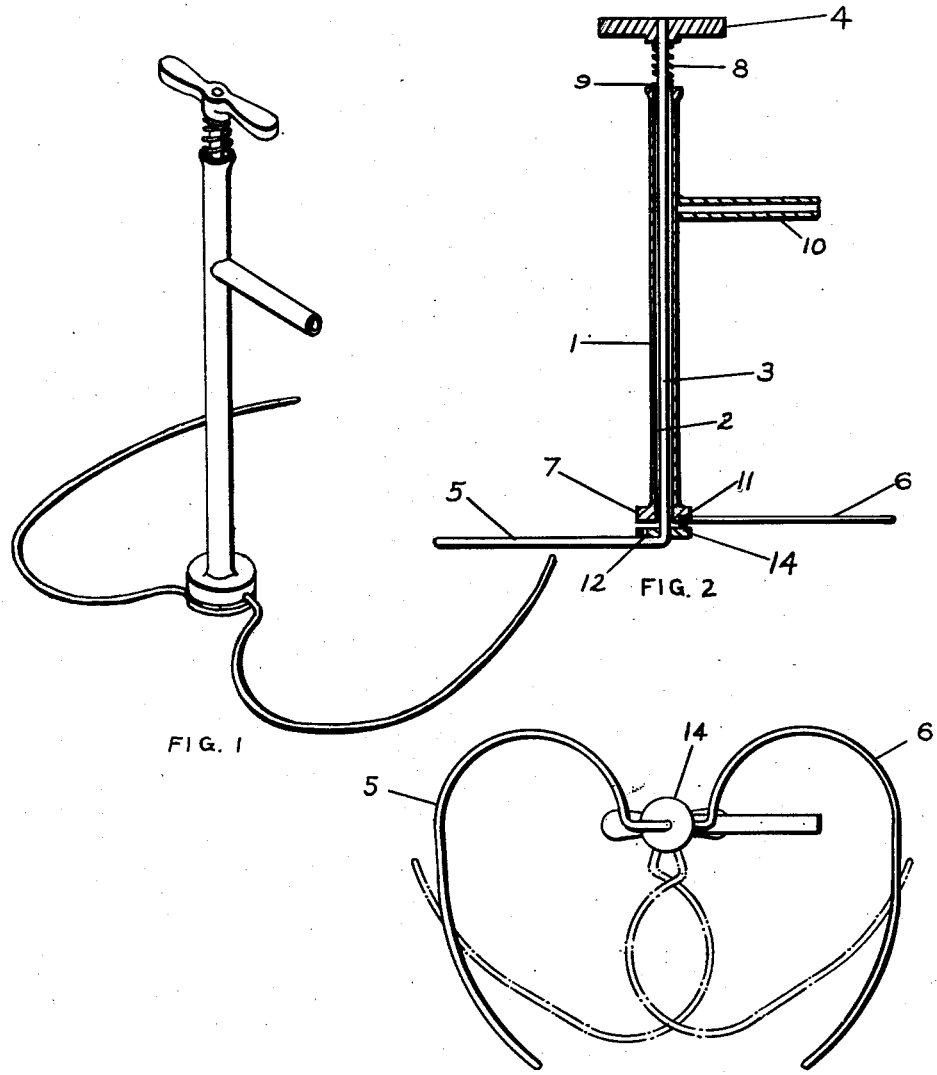
LOUIS E. KUBACKI
INVENTOR.
BY *[signature]*
ATTORNEY May 10, 1955

L. E. KUBACKI 2,707,845

WRAPPING DEVICE

Filed May 4, 1953

LOUIS E. KUBACKI
INVENTOR.

BY
ATTORNEY

United States Patent Office 2,707,845
Patented May 10, 1955

2,707,845

WRAPPING DEVICE

Louis E. Kubacki, Milwaukee, Wis., assignor to Rentner Metal Spinning Company, a corporation of Wisconsin Application May 4, 1953, Serial No. 352,934

11 Claims. (Cl. 47—1)

This invention relates to wrapping devices, and particularly pertains to a means for enwrapping a conglomerate article with a sheet-like covering.

Cauliflower agriculture requires delicate care to provide produce that meets the strictest of marketing standards. One of the stringent requirements relates to bleaching of the edible portion to provide a near-white "flower." Any dark, or unbleached, portions on the flower materially lower the market value of the vegetable. It has been the general practice to securely wrap the outer leaf portions around the edible flower during the latter stages of the growth cycle. This wrapping operation completely enshrouds the flower to prevent any light from entering to deleteriously color the flower and produce a less marketable plant.

The necessary wrapping practice is quite a cumbersome operation, and heretofore has been done by hand wrapping. That is, when the plants reached a certain maturity in growth, the grower actually gathered the outer leaves in his encircling arms and drew them upwardly to form a covering crown at the top. In most cases, a second person tied the leaves together, to secure them during the final bleaching stage. The plants were then appropriately marked and left for a prescribed number of days before harvesting.

It will be apparent that cauliflower raising has heretofore been an arduous task, involving considerable attention and manual labor, which ultimately affected consumer market prices.

It is therefore an object of the present invention to provide a device for enwrapping a conglomerate object, such as the edible portion of a cauliflower plant with a sheet-like covering, such as the outer leaves of these plants; and temporarily retaining these wrappings, leaving the operator free to apply means for tying or otherwise securing the covering in wrapped relationship.

It is another object of this invention to provide a wrapping device for enwrapping a conglomerate article with a sheet-like covering and releasably retaining said covering in wrapped position during further securing operations.

It is a further object of this invention to provide a wrapping device having opposed incurvate members laterally movable relative to one another to provide an expansible opening therebetween; and being adapted, when in expanded position, to slidably enwrap a conglomerate object with a sheet-like covering, and to releasably draw the free ends of said covering towards one another when moved to constricted opening position to permit the securing of these ends in wrapped relationship.

It is still another object of this invention to provide a wrapping device having opposed incurvate members rotatably movable laterally relative to one another and defining an expansible opening therebetween, and including releasable retaining means in the form of cooperating detent and indent portions normally biased towards locking engagement with one another for temporarily retaining relative opening dimensions.

Embodiments of the invention are shown in the accompanying drawings, in which:

Fig. 1 is a perspective view of one embodiment of the invention.

Fig. 2 is an elevational view, partly in section, of the wrapping device.

Fig. 3 is a bottom plan view of the device.

Figure 4:
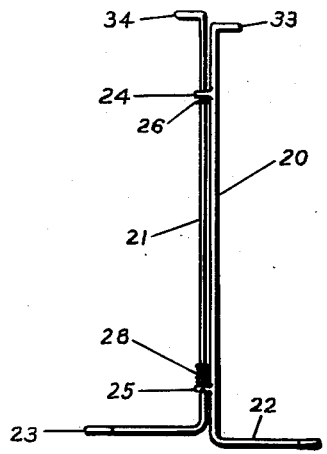
Fig. 4 is an elevational view of another embodiment of the invention.
Figure 5:
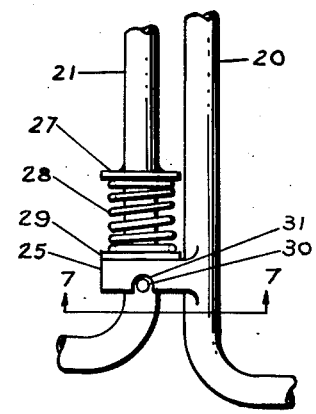
Fig. 5 is an enlarged fragmentary view of a portion of the cooperating members shown in Fig. 4.

The wrapping device may take the form of several embodiments, one embodiment being particularly illustrated by Figs. 1 to 3, inclusive, in which the device comprises a supporting tubular operating member 1 having a coextensive bore 2. The bore 2 is open at both ends and adapted to receive a freely slidable and rotatable rodlike operating member 3 terminating at one end in an operating handle 4, and at the other end in an integral incurvate embracing member 5 extending radially from and in a plane substantially normal to the rod-like member 3. An embracing member 6, formed to provide an incurvate portion in opposed relationship to the incurvate embracing member 5, is stationarily affixed to the tubular member 1 through an integral support block 7 and extends outwardly in substantially the same plane as the member 5.

The rod-like member 3 is arranged to receive a helical compression spring 8 circumjacent thereto. The spring 8 normally urges the rod-like member in an upward endwise direction with respect to the tubular member 1, as viewed in Figs. 1 and 2. One end of the spring engages the handle 4 while the opposite end engages the outwardly flanged upper surface of the tubular member 1 through an interposed slidable washer 9. The tubular member 1 is provided with an integral handle 10 extending laterally therefrom.

A releasable retaining means is provided at the support block 7 integral with the tubular member 1, and is in the form of detent 11 slidably engageable with an opening 12 provided in a separator 14 secured to the operating member 5. It will be apparent that the detent 11 and the opening are urged towards locking engagement by the action of the spring 8. It will also be apparent that the relative position of the detent and the engaging openings may be reversed (not shown) without affecting the operation or function of the device as will hereinafter be described.

In describing the operation of the present embodiment, it will be assumed that the embracing members 5 and 6 are in open position as shown in Figs. 1, 2 and 3. In this position, with the free ends of the operating members extending outwardly and spaced from one another, the device may be inserted from beneath an object, such as a cauliflower plant (not shown), and with the free ends of the members 5 and 6 embracingly receiving the plant therebetween. The device is then raised upwardly with the incurvate of members slidably gathering the outer leaves of the plant and drawing them upwardly. On reaching the upper surface of the plant, the handles 4 and 10 are rotated relative to one another to constrict the opening defined by the members 5 and 6. This constrictive rotative action gathers the free ends over the conglomerate article such as the plant "flower" and is continued until the detent 11 engages the opening 12 and thereby locks the operating members in closed position by action of the spring 8, as shown in dot-dash lines in Fig. 3.

With the device locked in closed position as described, the open or free ends of the sheet-like covering, such as plant leaves, will be held together and leave the operator free to tie or otherwise bind the covering ends together. In fact, it has been found that in the case of cauliflower plants, the device will remain stable, in locked position, to free both hands of the operator.

After the covering is tied, the operator merely draws both handles 4 and 10 apart to disengage the detent 11 from the opening 12, and rotates the handles relative to one another to open the operating members to the position shown in Fig. 1. The gathering and tying cycle is resumed on the next plant. It will be apparent that additional engagement with the detent 11 (not shown) may be provided if desired to lock the device in various operating positions.

It is to be noted that though the term "incurvate" has been used throughout the specification in describing a configuration of the operating members, it is intended to be taken in its broadest sense to define embracing members movable laterally relative to one another to provide an expansible opening therebetween.

The second embodiment will now be described in connection with Figs. 4, 5, 6 and 7, wherein rod-like operating members 20 and 21 are positioned to be rotatably movable relative to one another and include incurvate embracing portions 22 and 23, respectively, defining an expansible opening therebetween lying in a plane substantially normal to the axis of the members 20 and 21. A preferred mounting arrangement is as shown, with the member 20 having spaced integral brackets 24 and 25 adapted to slidably and rotatably receive the rod-like member 21. It will be obvious that the brackets may be fastened to the rod-like member 21 and embracing the rod-like member 20 (not shown) and serve equally well.

The rod-like members are maintained in separated operating position by means of spaced circular members 26 and 27 integral with the rod-like member 21. The lower circular member 27 also acts as a stop for a compression spring 28 normally urging the members 20 and 21 in opposed endwise directions relative to one another. The spring 28 also bears against a washer 29 slidable on the rod-like member 21 and abutting the lower bracket 25 on the member 20.

Figure 6:
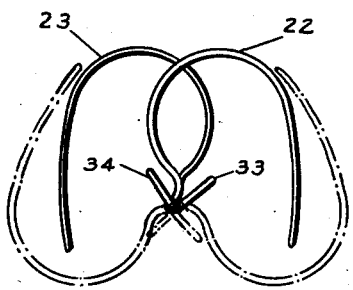
Fig. 6 is a top plan view of the embodiment of Figs. 4 and 5.
Figure 7:
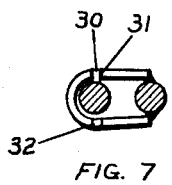
Fig. 7 is a cross sectional view taken on line 7—7 of Fig. 5.

The rod-like member 21 is provided with a detent pin 30 projecting transversely relative to the axis of said member. The pin 30 is releasably engageable with opposed U-shaped indents 31 and 32 on the lower bracket 25, and is biased towards engagement with the detents by the action of the spring 28. As shown in Fig. 7, the pin is engaged with indent 31 with the embracing portions 22 and 23 is closed relationship. The upper extremities of the rod-like members 20 and 21 are preferably bent to form handle portions 33 and 34, respectively as seen in Fig. 6.

The operation of the presently described embodiment is similar to that of the first-mentioned structure, and assuming the operating members are in the position shown in Fig. 4, the opening defined by the portions 22 and 23 will be in constricted position. To expand the opening, the operator need merely push downwardly on the handle 33 relative to the handle 32, and simultaneously rotate the handles relative to one another to the position of the embracing portion, shown in dot-dash lines of Fig. 6. The pin 30 will then lockingly engage the indent 30 of the bracket 25 to hold the members apart. It will be apparent, that though it is preferable to provide the indent 30, the device will act satisfactorily without this feature, if so desired. It does, however, provide a positive acting means for orienting the rotatable members and prevents overtravel during rotation.

Though it is preferred in both embodiments to provide a temporary latching means for retaining the members in predetermined rotative position, it will be apparent that such means may be eliminated and the handles of the operating members may be held in closed position by the operator. He may then tie the ends of the leaves of the plant together by slipping over a rubber band held in his free hand.

It will be apparent that a novel wrapping device has been provided which is inexpensive to manufacture and facilely operated, and which has particular adaptability for use in the growing of cauliflower plants, especially during the bleaching period wherein the outer leaves are positioned to completely conceal the flower portion from the detrimental coloring effects of the sun's rays.

I claim:

1. A device for enwrapping conglomerate articles with a sheet-like covering comprising a pair of opposed embracing members laterally movable relative to one another and defining an expansible opening therebetween, and a pair of spaced operating members rotatably movable relative to one another and each being individually and operatively associated with a respective embracing member to actuate said opposed members towards relatively expanded and contracted opening position, and releasable locking means for temporarily retaining said embracing members in predetermined position laterally relative to one another, said embracing members and said operating members each respectively lying in planes angularly disposed relative to one another.

2. A device for enwrapping conglomerate articles with a sheet-like covering comprising a pair of opposed embracing members laterally movable relative to one another and defining an expansible opening therebetween, a pair of spaced operating members rotatably and slidably movable relative to one another and each being individually and operatively associated with a respective embracing member to actuate said opposed members towards relatively expanded and contracted opening position, and releasable locking means for temporarily retaining said embracing members in predetermined position laterally relative to one another, said locking means operatively associated with said operating members for movement towards locking or unlocking relationship on relative sliding motion of said operating members.

3. A device for enwrapping conglomerate articles with a sheet-like covering comprising a pair of opposed embracing members laterally movable relative to one another and defining an expansible opening therebetween, a pair of spaced operating members rotatably and slidably movable relative to one another and each being individually and operatively associated with a respective embracing member to actuate said opposed members towards relatively expanded and contracted opening position, and releasable locking means for temporarily retaining said embracing members in predetermined position laterally relative to one another, said locking means operatively associated with said operating members for movement towards locking or unlocking relationship on relative sliding motion of said operating members, and releasable locking means normally biased towards locking engagement and comprising a detent member on one of said embracing members and a detent-receiving opening in the other of said members to retain said members in predetermined position laterally relative to one another.

4. A wrapping device comprising in combination a pair of operating members having their axes in parallel spaced relationship and rotatable and slidable relative to one another, spring means normally biasing said members towards slidable opposed endwise motion, said operating members each terminating in opposed embracing portions, said embracing portions being laterally movable relative to one another in a plane angularly disposed to the parallel axes of said operating members and defining an expansible opening therebetween, and releasable locking means for temporarily retaining said operating members in predetermined rotative operating position.

5. A wrapping device comprising in combination a pair of operating members having their axes in parallel spaced relationship and rotatable and slidable relative to one another, spring means normally biasing said members towards slidable opposed endwise motion, said operating members each terminating in opposed embracing portions, said embracing portions being laterally movable relative to one another in a plane substantially normal to the plane of the parallel axes of said operating members and defining an expansible opening therebetween, and releasable locking means normally biased towards locking engagement by the biased endwise movement of said operating members to prevent predetermined rotative movement of said members.

6. A wrapping device comprising in combination a tubular operating member having a coextensive bore, a rod-like operating member contained within said bore and freely rotatable relative to said tubular member, each of said members respectively terminating in opposed embracing portions, said embracing portions being laterally movable relative to one another in a plane angularly disposed to the longitudinal axis concentric with said operating members and defining an expansible opening therebetween, and releasable locking means for temporarily retaining said operating members in predetermined rotative operating position.

7. A wrapping device comprising in combination a tubular operating member having a coextensive bore, a rod-like operating member contained within said bore and freely rotatable relative to said tubular member, each of said members respectively terminating in opposed embracing portions, spring means normally biasing said operating members towards slidable opposed endwise motion, said embracing portions being laterally movable relative to one another in a plane substantially normal to the longitudinal axis concentric with said operating members and defining an expansible opening therebetween, and releasable locking means for temporarily retaining said operating members in predetermined rotative operating position.

8. A wrapping device comprising in combination a tubular operating member having a coextensive bore, a rod-like operating member contained within said bore and freely rotatable relative to said tubular member, each of said members respectively terminating in opposed embracing portions, spring means normally biasing said operating members towards slidable opposed endwise motion, said embracing portions being laterally movable relative to one another in a plane substantially normal to the longitudinal axis concentric with said operating members and defining an expansible opening therebetween, and releasable locking means normally biased towards locking engagement and comprising a detent member on one of said operating members and a detent-receiving opening in the other of said members to temporarily retain said members in predetermined rotative operating position.

9. A wrapping device comprising in combination a first and a second rod-like operating member in parallel relationship, bracket means integral with said first operating member and arranged to rotatably receive said second operating member, each of said members respectively terminating in opposed embracing portions, said embracing portions being laterally movable relative to one another in a plane angularly disposed to the plane common to said parallel operating members and defining an expansible opening therebetween, and releasable locking means for temporarily retaining said operating members in predetermined rotative operating position.

10. A wrapping device comprising in combination a first and a second rod-like operating member in parallel relationship, bracket means integral with said first operating member and arranged to rotatably receive said second operating member, each of said members respectively terminating in opposed embracing portions, spring means normally biasing said operating members towards slidable opposed endwise motion, said embracing portions being laterally movable relative to one another in a plane substantially normal to the plane common to said parallel operating members and defining an expansible opening therebetween, and releasable locking means for temporarily retaining said operating members in predetermined rotative operating position.

11. A wrapping device comprising in combination a first and a second rod-like operating member in parallel relationship, bracket means integral with said first operating member and arranged to rotatably receive said second operating member, each of said members respectively terminating in opposed embracing portions, spring means normally biasing said operating members toward slidable opposed endwise motion, said embracing portions being laterally movable relative to one another in a plane substantially normal to the plane common to said parallel operating members, and defining an expansible opening therebetween, and releasable locking means normally biased toward locking engagement and comprising a detent pin transversely of said second operating member and a detent-receiving notch in said bracket means to temporarily retain said operating members in predetermined rotative operating position.

References Cited in the file of this patent

UNITED STATES PATENTS

| | | |
|---|---|---|
| 502,672 | Johnson | Aug. 1, 1893 |
| 728,941 | Lanham | May 26, 1903 |
| 730,370 | Hendrix | June 9, 1903 |
| 818,869 | Calvert | Apr. 24, 1906 |
| 1,877,548 | Brimer | Sept. 13, 1932 |
| 2,135,232 | Dawn | Nov. 1, 1938 |
| 2,302,208 | Glasener | Nov. 17, 1942 |